Figure 1A:
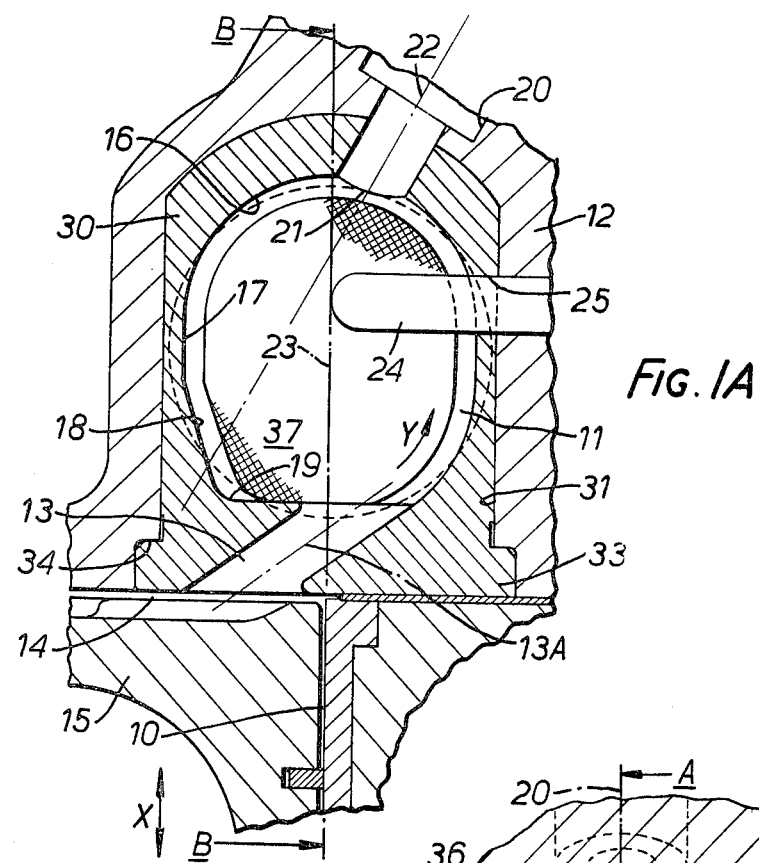

United States Patent [19]

Thring et al.

[11] 4,425,884

[45] Jan. 17, 1984

[54] CATALYTIC COMBUSTION ENGINES

[75] Inventors: Robert H. Thring, Steyning; Terence Hollis, Worthing, both of England

[73] Assignee: Ricardo Consulting Engineers plc, England

[21] Appl. No.: 364,306

[22] Filed: Apr. 1, 1982

[30] Foreign Application Priority Data

Apr. 2, 1981 [GB] United Kingdom ............... 8110389

[51] Int. Cl.³ .................................. F02B 19/08
[52] U.S. Cl. ................................ 123/272; 123/275
[58] Field of Search ........... 123/272, 275, 263, 143 R, 123/261, 670, 193 B

[56] References Cited

U.S. PATENT DOCUMENTS

| | | | |
|---|---|---|---|
| 455,329 | 10/1836 | Jackson | 123/272 |
| 2,113,711 | 4/1938 | Ricardo | 123/275 |
| 2,513,874 | 7/1950 | Howard | 123/272 |
| 2,821,177 | 1/1958 | Holt | 123/262 |
| 4,092,967 | 6/1978 | Haslett | 123/272 |
| 4,369,746 | 1/1983 | Thring | 123/272 |

FOREIGN PATENT DOCUMENTS 2919743 11/1980 Fed. Rep. of Germany ...... 123/272

OTHER PUBLICATIONS

Vol. 89, No. 11, pp. 89-91, "Automotive Engineering", Article on Catalytic Engines.

Primary Examiner—Raymond A. Nelli
Attorney, Agent, or Firm—Price, Heneveld et al.

[57] ABSTRACT

A catalytic combustion engine, each cylinder of which has a pre-combustion chamber communicating through an inclined transfer cylinder to produce swirl around the chamber, and has a pair of spaced parallel or nearly-parallel catalytic screen elements, e.g. gauzes, mounted to both the mouth of the transfer passage and the fuel injector nozzle, so as to be clear of the circumferential swirl path of the gas circulating in the chamber. The minimum spacing between the two catalytic screens should exceed the width of the mouth of the transfer passage. The injector injects a fuel spray between the two catalytic screens which preferably just brushes each screen and impinges on a heater plug. The compression ratio may be much lower than that for a conventional Diesel engine, for example down to 12:1.

18 Claims, 6 Drawing Figures

U.S. Patent   Jan. 17, 1984   Sheet 3 of 3   4,425,884

CATALYTIC COMBUSTION ENGINES

This invention relates to reciprocating-piston internal combustion engines of the type which employs a catalyst in the or each combustion chamber to initiate and promote combustion at the compression temperature in the chamber. Such engines are referred to herein as catalytic combustion engines.

Our prior patent application No. 7930836 relates to a catalytic combustion engine without spark ignition, provided in its cylinder head or heads with a precombustion chamber associated with each cylinder and connected with the space in the cylinder above the piston crown via a transfer passage so disposed as to promote swirl in the precombustion chamber during the compression stroke of the associated piston, and injector means for injecting a spray of liquid fuel into the precombustion chamber shortly before top-dead-centre, the air for combustion being admitted directly into the main combustion space in the cylinder, and which is further provided with a catalytic element mounted in the precombustion chamber. In a specific construction described and illustrated in that prior application, a catalytic screen e.g. of gauze extends completely across the interior of the precombustion chamber, below its domed upper portion machined in the cylinder head, the gauze extending at right angles to the axis of reciprocation of the piston in the associated cylinder in a position between the fuel injection nozzle and the mouth of the transfer passage which connects the interior of the precombustion chamber with the cylinder space above the piston. With this arrangement, the gas flow and swirl conditions within the precombustion chamber may be considerably affected by the passage of the gases through the "horizontal" layer of catalytic gauze, and in some cases this may result in a loss of engine performance.

It is an object of the invention to provide a different arrangement of a gas-permeable catalytic screen, for example gauze, in the precombustion chamber, in which interference with the gas flow movement within the precombustion chamber by the catalytic screen will be less than in the prior "horizontal" arrangement referred to.

According to the present invention, in a catalytic combustion engine having a precombustion chamber associated with the or each cylinder as described above, with a catalytic element mounted in the precombustion chamber, the catalytic element comprises at least one foraminous screen member, for example a grid, mesh or gauze, mounted to enclose a segment of the interior of the precombustion chamber and lying on one and the same side of both the mouth of the transfer passage and the nozzle of the fuel injector means, without substantially intersecting the circumferential swirl path around the interior of the chamber for gas flows injected into the chamber through the transfer passage.

For example a pair of catalytic screen members, e.g. gauzes, may be provided in each precombustion chamber, the members respectively enclosing segments of its interior on opposite sides of the mouth of the transfer passage and injector nozzle, the minimum spacing between the two catalytic screen members being greater than the width of the mouth of the transfer passage.

In a preferred construction the pair of catalytic screens comprise generally planar parallel screens, e.g. gauzes, which are disposed in a symmetrical arrangement with respect to and parallel to the longitudinal axis of the transfer passage. In a typical construction the screens will lie parallel to the cylinder bore axis, the axis of the transfer passage being oblique to the cylinder bore axis and the passage entering the precombustion chamber generally tangentially. Thus an unimpeded circumferential swirl path is provided around the interior of the precombustion chamber between the parallel screens, into which the fuel is sprayed by the injector means. It may be found preferable for the injector to be arranged so that the injected fuel spray just brushes one or each of the screens.

The fuel injector axis can be preset with respect to the cylinder bore axis, at any preferred angle between the perpendicular and the parallel thereto, as required to optimise injection variables with maximum engine performance.

Figure 1B:
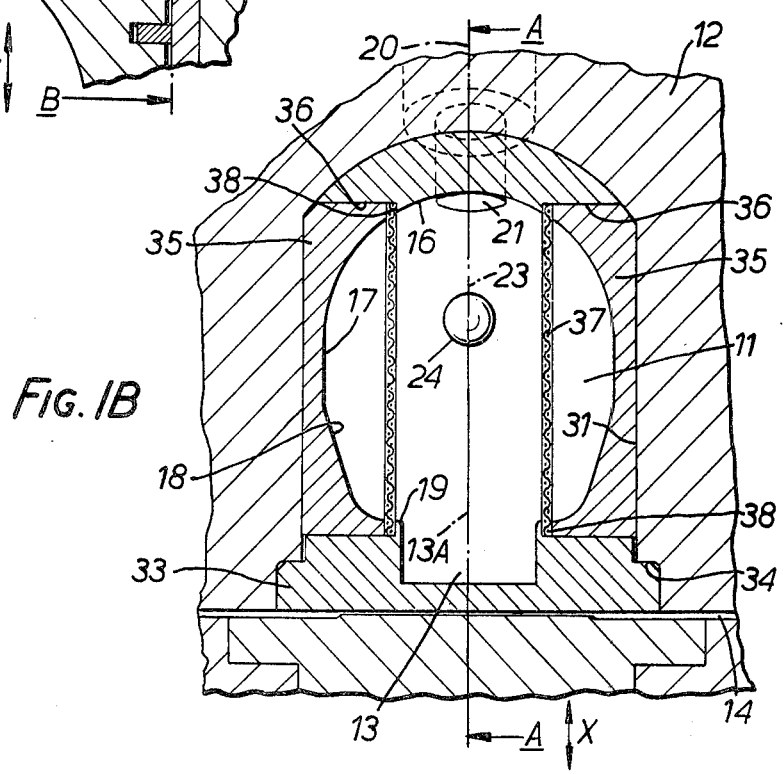
Figure 2A:
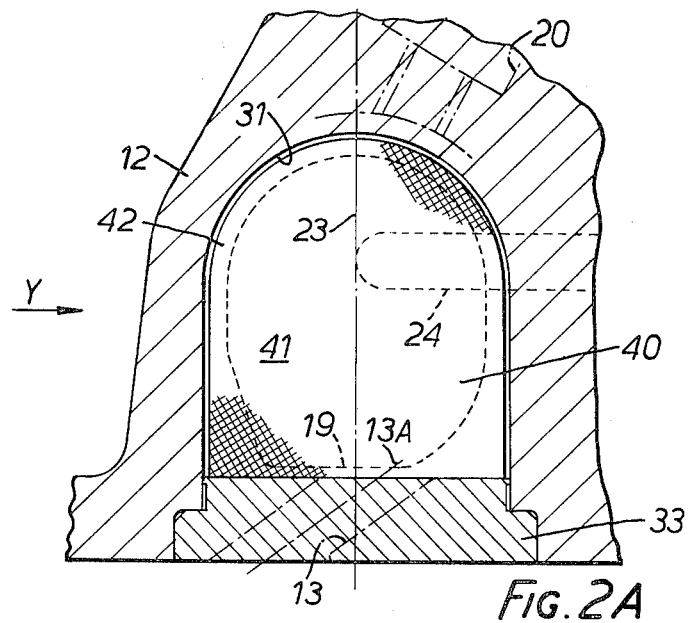
Figure 2B:
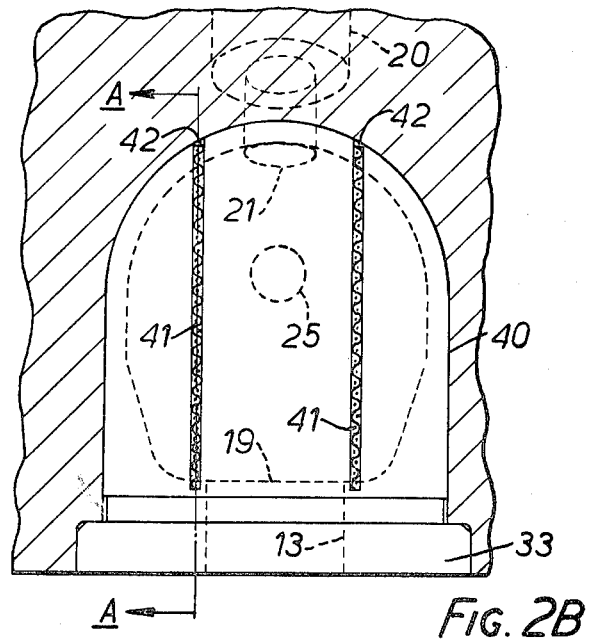
Figure 3A:
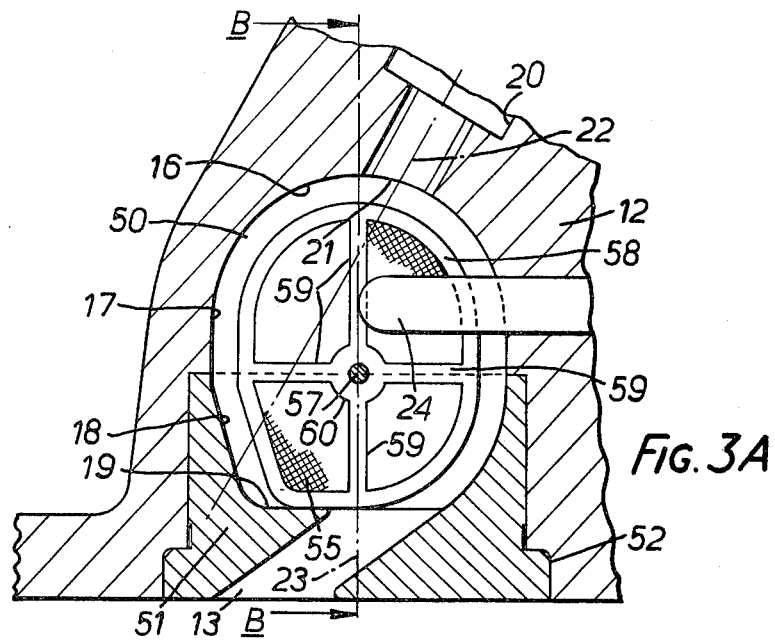
Figure 3B:
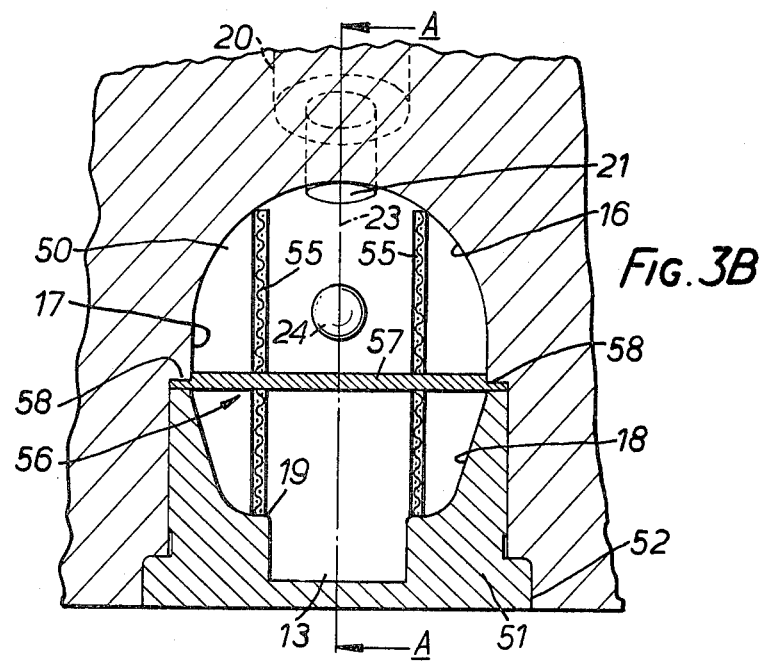

The invention may be carried into practice in various ways, but three specific embodiments thereof will now be described by way of example only and with reference to the accompanying drawings, in which FIG. 1A is a view in section on the line A—A of FIG. 1B, showing a fragment of the cylinder block and cylinder head of an air-compressing engine and showing a pre-combustion chamber with twin catalytic screens in the cylinder head, FIG. 1B is a view in section on the line B—B of FIG. 1A, FIG. 2A is a view in section on the line A—A of FIG. 2B, showing a fragment of the cylinder head of an engine with a different construction and arrangement of precombustion chamber and twin catalytic screen, FIG. 2B is an elevation of the exterior of the integral precombustion chamber shell in FIG. 2A, as seen in the direction of the arrow Y in that Figure, FIG. 3A is a view in section on the line A—A of FIG. 3B, showing yet another different construction and arrangement of the precombustion chamber with twin screens, and FIG. 3B is a section on the line B—B in FIG. 3A.

In the embodiment of FIGS. 1A and 1B, each cylinder 10 of a multi-cylinder reciprocating piston i.c. engine has a precombustion chamber 11 containing catalytic elements 37 formed in its cylinder head 12 and communicating through a passage 13 (referred to as the transfer passage) with the clearance volume 14 within the cylinder 10 above the crown of the associated piston 15. The engine is of the air-compressing piston type constructed and operated on generally similar principles to a conventional Diesel engine, i.e. without any spark ignition, but the mixture of injected fuel and compressed air are ignited catalytically in the precombustion chamber under the prevailing compression pressure at around top-dead centre, the subsequent combustion being promoted by the catalyst. Each precombustion chamber 11 is of the Ricardo Comet Mark V form (see British patent specification No. 786,329) and has a hemispherical "upper" part 16 remote from the cylinder 10, merging into a short cylindrical intermediate portion 17, the "lower" portion 18 of the precombustion chamber 11 being of mainly frusto-conical form tapering towards the cylinder 10 and having a flat bottom wall 19. The axis 13A of the transfer passage 13 is inclined to the bore axis of the cylinder 10 and opens through the flat bottom 19 of the chamber in a generally "tangential" disposition with respect to the internal surface of the chamber 11, so that during each compression stroke of the piston 15 air charge previously admitted to the cylinder 10 will be forced under pressure through the transfer passage 13 and will enter the precombustion chamber tangentially thus setting up a swirl around the chamber 11 in the direction indicated by the arrow Y in FIG. 1A, the swirl path being around an axis at right angles to the direction of reciprocation of the piston 15 (indicated by arrow X) and to the axis 13A of the passage 13 and parallel to the flat bottom 19 of the chamber 11.

A fuel injector is housed in a recess 20 formed in the cylinder head 12 to inject a spray of liquid hydrocarbon fuel through an aperture 21 formed in the upper part of the hemispherical upper portion 16 of the chamber 11, the axis of injection 22 being inclined at a predetermined angle to the "vertical" axis of symmetry 23 of the chamber 11, which it intersects at a point C above the centre O of the domed upper portion 16 of the chamber 11 as shown in the drawings. Thus the fuel spray is injected generally tangentially and downstream into the swirling gas travelling around the interior of the chamber 11. An electrical heater (or glow) plug 24 projects "horizontally" into the interior of the chamber through a recess 25 in the side of the chamber 11, its axis 24A intersecting the axis 23 between the points C and O.

In this embodiment, each precombustion chamber 11 is formed in a separate shell member 30 which is a close fit in a corresponding recess 31 machined in the cylinder head 12, and located by an integral circumferential flange 33 against a step 34 in the cylinder head recess 31. Two side wall plugs 35 are inserted as a light press fit into recesses 36 formed in opposite side walls of the shell member 30, the internal surfaces of the shell member 30 and the two side wall plugs 35 together defining the internal shape of the precombustion chamber 11. The plugs 35 are retained by engagement against the wall of the recess 31 in the cylinder head when the shell member and plugs are fitted into that recess. The shell member 30 and the two side wall plugs are precision castings of a suitable heat-resistant material, for example the nickel alloy sold under the trade name NIMO-CAST. Once the assembly 30,35,35 has been fitted into the cylinder head recess 31, the working pressures within and without the precombustion chamber 11 will be closely equal, so that the positions of the side plugs 35 will not be distrubed when the engine is running.

The two side wall plugs 35 are used to clamp the margins of a pair of respective circular catalytic screens 37 against circumferential steps 38 which terminate the recesses 36 in opposite sides of the shell member 30. As shown, the catalytic screens 37 are plane parallel circular sheets of gauze, with suitable wire reinforcement.

For example each gauze 37 may be a circular disc made of metallic platinum or other catalytic metal wire and be supported on a frame of stronger wire. Alternatively it may comprise a thicker mesh or porous screen made of non-catalytic metal or ceramic material coated with an appropriate base ceramic wash on which a suitable oxidation catalyst is deposited by means well known in the relevant art.

The sealing of the injector and of the heater plug 24 will be effected in the cylinder head, although if desired sealing against the combustion chamber wall can be effected by well-known but more complicated methods.

It will be appreciated that the two parallel catalytic gauzes lie one on either side of the mouth of the transfer passage 13, with the inclined axis 13A of the latter being also parallel to the gauzes, so that the flow of air injected through the passage 13 on each compression stroke will be free to circulate around the internal circumference of the precombustion chamber 11 without the gauzes projecting into or across its circumferential swirl path. Moreover the injector nozzle injects the fuel spray into the space between the parallel gauzes, and hence into the swirl path of the circulating air flow, in the downstream tangential direction along an axis parallel to the gauzes and midway between them, the spray of fuel being preferably arranged just to brush the gauzes. The angle of inclination of the axis 22 of injection to the "vertical" axis of symmetry 23 of the chamber 11 can be predetermined as required for maximum engine performance. The heater plug 24 also projects into the space between the gauzes 37, in a position in which a portion of the injected fuel spray will impinge upon it.

In the arrangement of FIGS. 1A and 1B, the two catalytic gauzes 37 are positively clamped between the plugs 35 and the steps 36 of the shell member 30, around their entire peripheries. As shown, the gauzes are circular in profile and are arranged parllel to one another and to the "vertical" axis of symmetry 23 of the chamber 11. If desired however the arrangement could be modified so as to clamp the gauzes in a symmetrical arrangement inclined at small equal angles to the axis 23, provided they do not intrude substantially into the swirl path of the circulating air.

FIGS. 2A and 2B show a modified arrangement in which a one-piece precombustion chamber shell 40 is used and the gauzes 41 are located in parallel slits 42 formed in the shell 40.

In this embodiment the whole shell 40 including the flanged base is precision-cast as an integral unit using the lost-wax shell moulding technique or a ceramic core method of moulding, and is inserted as a whole in the recess 31 machined in the cylinder head 12, and is located by the bottom flange 33. The clearance between the exterior of the shell 40 and the interior of the recess 33 is arranged to be as small as possible, and suitable holes 21 and 25 are precast in the shell 40 to receive the fuel injector nozzle and the heater plug in the same positions as in FIGS. 1A and 1B. The fuel injector 21 and heater (glow) plug 24 are located and gas-sealed in the usual way in the cast exterior cylinder head structure.

Whilst it would theoretically be possible for the catalytic screens 41 to be cast in situ in the shell 40 in their appropriate positions during the casting of the shell itself, there are difficulties in doing so in practice in that the gauze or other screens would have to be made of material which will neither melt nor dissolve when the molten casting material to form the shell 40 is poured into the mould in which the screens have been positioned. If the screens are made for example of platinum, this metal has a higher melting point than the typical NIMOCAST or similar heat-resistant alloy used to cast the shell 40, but since the casting alloy contains nickel with which platinum can form a solid solution it is likely that the platinum gauzes would be dissolved in the molten alloy during the casting.

Accordingly in this embodiment the shell 40 after casting is formed with a pair of parallel slits 42 spaced apart on either side of the mouth of the transfer passage 13 and parallel to the axes 13A and 23, each slit extending from the top of the domed upper portion of the shell 40 down to or (as shown) slightly below the surface of the flat bottom 19 of the precombustion chamber 11. The two catalytic screens 41, of profile shown in FIG.

2A, are fully inserted in the respective slits 42, wherein they will be positively located when the shell 40 is inserted into the cylinder head recess 31.

FIGS. 3A and 3B show another embodiment of the invention, in which the upper part of the precombustion chamber is define by the internal surface of the upper part of a recess 50 machined directly in the cylinder head 12, to form the hemispherical upper surface 16 and the intermediate cylindrical surface 17 of the chamber as machined surfaces, whilst the tapered lower portion 18 and bottom 19 of the chamber 11 are formed by a recess in a separate "hot plug" 51 made of refractory material which is inserted into the correspondingly-shaped lower part of the recess 50 and located by its bottom flange 52, as is well-known practice for a Comet-type precombustion chamber.

The catalytic screens 55 in this case form part of a dumb-bell-shaped insert assembly 56 comprising a rod 57 which extends across the chamber 11, upon which rod the two screens 55 are mounted at their required spacing, the rod 57 extending through mounting apertures in the screens 55 and at right angles thereto. The two end portions of the rod are formed with flats 58 and rest in hemi-cylindrical notches in the rim of the hot plug 51 where they are trapped by a step in the machined recess 50 in the head 12, as shown in FIG. 3B, and the two catalytic screens 55 are profiled to abut the internal surface of the chamber 11 around their entire peripheries, one on either side of the mouth of the transfer passage 13 formed in the hot plug 51. Thus as before, the catalytic screens are mounted in spaced parallel positions and lie parallel to the inclined axis of the transfer passage 13 and to the inclined spray axis 22, as before, as well as being parallel to the "vertical" axis of symmetry 23 of the precombustion chamber 11.

In this embodiment each catalytic screen 55 may comprise a metallic catalytic gauze supported for strength by a stiff outer rim 58 and radial spokes 59, of stout metal wire or strip, with a central wire or strip hub 60 through which the rod 57 extends. Alternatively, as previous suggested in reference to the embodiment of FIGS. 1A and 2A, each screen 55 could be of a thicker foraminous metallic or even ceramic screen material coated with a base ceramic wash on which a suitable oxidation catalyst layer is deposited by known means.

In each of the specific embodiments illustrated in FIGS. 2A,2B and 3A,3B, the catalytic screens may be slightly inclined to the axis of symmetry 23 of the precombustion chamber 11, provided that they do not intrude significantly into the circumferential air swirl path around the chamber.

In all three specific embodiments, the spacing between the catalytic screens where they are parallel, or the minimum spacing where they are inclined to one another, should preferably exceed the width of the transfer passage 13 at its throat, which is normally about 0.45 times the maximum diameter of the precombustion chamber. The precise spacing between the screens may be determined by trial and error to optimise results. It is likely that this spacing should be between 0.35D and 0.60D where D is the diameter of the hemispherical upper portion 16 of the precombustion chamber shell.

As mentioned, it is preferred that at least a part of the injected fuel spray should brush against the two catalytic gauzes in each case, and that the heater plug should be so positioned that a part of the fuel spray impinges on it.

Each of the specific embodiments described and illustrated will operate by catalytic self-ignition and combustion at a very much lower compression ratio than that required for a diesel engine without catalytic ignition, which is around 21.1:1. For example the illustrated arrangement will operate satisfactorily at a compression ratio very much lower than 21.1:1 and down to around 12:1, which as explained in our aforesaid application No. 7930836 is the theoretically-optimum compression ratio for an I.C. engine as regards brake horsepower output. Moreover the arrangement of twin "vertical" or near- "vertical" catalytic screens provided in each of the illustrated embodiments is found to enable a greater maximum power output to be produced in certain circumstances than is possible with a similar engine having the "horizontal" catalytic screen arrangement of our application No. 7930836.

We claim:

1. A reciprocating-piston air-compressing internal combustion engine with catalytic ignition, having at least one cylinder, a reciprocating piston in the cylinder, a cylinder head defining with the piston a main combustion space in the cylinder, into which space air for combustion with fuel is directly admitted, and a pre-combustion chamber in the cylinder head, a transfer passage interconnecting the pre-combustion chamber and the said main combustion space, said transfer passage having a longitudinal axis and having a mouth opening into the pre-combustion chamber and being so disposed as to promote swirl in the air forced through the transfer passage into the pre-combustion chamber during each compression stroke of the piston, the said swirling air circulating in a circumferential swirl path around the interior of the pre-combustion chamber, injector means having a nozzle for injecting a spray of liquid fuel into the pre-combustion chamber shortly before piston top-dead-centre, and a catalytic element mounted in the pre-combustion chamber and adapted to initiate and promote combustion of fuel/air mixture compressed in the pre-combustion chamber at about top-dead-centre, the said catalytic element comprising a foraminous catalytic screen member with a surface of catalytic material mounted to enclose a segment of the interior of the pre-combustion chamber and lying on one and the same side of both the mouth of the transfer and the nozzle of the injector means, in a position substantially to one side of and clear of the said circumferent swirl path of the circulating air.

2. An engine as claimed in claim 1, provided with a pair of the said catalytic screen members mounted in the pre-combustion chamber and respectively enclosing segments of the interior of the said chamber on opposite sides of the mouth of the transfer passage and of the nozzle of the injector means.

3. An engine as claimed in claim 2, in which the two catalytic screen members are planar and are disposed in a symmetrical arrangement with respect to the longitudinal axis of the transfer passage.

4. An engine as claimed in claim 3 in which the two planar catalytic screen members are parallel to one another and to the longitudinal axis of the transfer passage.

5. An engine as claimed in claim 3 in which the two planar catalytic screen members are inclined at equal small acute angles to the longitudinal axis of the transfer passage.

6. An engine as claimed in claim 3 in which the nozzle of the injector means is arranged to spray fuel along an axis midway between the two catalytic screens.

7. An engine as claimed in claim 6, in which the nozzle of the injector means is arranged to inject into the pre-combustion chamber a spray of fuel which just brushes each of the catalytic screen members.

8. An engine as claimed in claim 7 including a heater plug projecting into the pre-combustion chamber in a position between the two catalytic screen elements in which the spray of injected fuel will impinge on it.

9. An engine as claimed in either of claims 2 or 8, in which each catalytic screen member is a gauze whose surface is of catalytic material.

10. An engine as claimed in either of claims 2 or 8, including a hollow shell assembly of refractory material inserted in a recess in the cylinder head, the interior of the shell assembly constituting the pre-combustion chamber, and in which each of the catalytic screen members is clamped around its periphery between two mating portions of the shell assembly.

11. An engine as claimed in either of claims 2 or 8, in which each catalytic screen member is located in a groove formed around the internal surface of the pre-combustion chamber.

12. An engine as claimed in either of claims 2 or 8, in which each catalytic screen member is mounted on a supporting rod which extends through that member and is supported at its opposite ends in the wall of the pre-combustion chamber.

13. An engine as claimed in either of claims 2 or 8, in which the minimum spacing between the two catalytic screen members exceeds the width of the mouth of the transfer passage.

14. An engine as claimed in claim 13, in which the pre-combustion chamber has a hemi-spherical upper portion opposite to the mouth of the transfer passage, and in which the minimum spacing between the two catalytic screen members lies in the range from 0.35 D to 0.60 D, where D is the diameter of the said hemi-spherical upper portion.

15. An engine as claimed in either of claims 2 or 8, having a compression ratio in the range from 21.1:1 to 12:1.

16. An engine as claimed in claim 2 including a heater plug projecting into the pre-combustion chamber in a position between the two catalytic screen elements in which the spray of injected fuel will impinge on it.

17. An engine as claimed in either of claims 2 or 8 in which the minimum spacing between the two catalytic screen members exceeds the width of the mouth of the transfer passage; the pre-combustion chamber having a hemi-spherical upper portion opposite to the mouth of the transfer passage, and in which the minimum spacing between the two catalytic screen members lies in the range from 0.35 D to 0.60 D, where D is the diameter of the said hemi-sphereical upper portion.

18. An engine as claimed in either of claims 2 or 8 in which the minimum spacing between the two catalytic screen members exceeds the width of the mouth of the transfer passage; the pre-combustion chamber having a hemi-spherical upper portion opposite to the mouth of the transfer passage, and in which the minimum spacing between the two catalytic screen members lies in the range from 0.35 D to 0.60 D, where D is the diameter of the said hemi-spherical upper portion; said engine having a compression ratio in the range from 21.1:1 to 12:1.

* * * * *